(12) United States Patent
Kudssi

(10) Patent No.: US 10,810,265 B2
(45) Date of Patent: Oct. 20, 2020

(54) AUTOMATIC NOTE BOARD DATA CAPTURE AND EXPORT

(71) Applicant: JPMorgan Chase Bank, N.A., New York, NY (US)

(72) Inventor: Amro Kudssi, Westmont, IL (US)

(73) Assignee: JPMORGAN CHASE BANK, N.A., New York, NY (US)

(*) Notice: Subject to any disclaimer, the term of this patent is extended or adjusted under 35 U.S.C. 154(b) by 333 days.

(21) Appl. No.: 15/799,181

(22) Filed: Oct. 31, 2017

(65) Prior Publication Data

US 2019/0272332 A1    Sep. 5, 2019

(51) Int. Cl.
| | |
|---|---|
| *G06F 16/93* | (2019.01) |
| *G06K 9/00* | (2006.01) |
| *G06K 9/62* | (2006.01) |
| *G06T 7/13* | (2017.01) |
| *G06T 7/70* | (2017.01) |
| *G06F 16/34* | (2019.01) |
| *G06F 16/35* | (2019.01) |

(52) U.S. Cl.
CPC ............ *G06F 16/93* (2019.01); *G06F 16/345* (2019.01); *G06F 16/353* (2019.01); *G06K 9/00442* (2013.01); *G06K 9/00483* (2013.01); *G06K 9/6202* (2013.01); *G06T 7/13* (2017.01); *G06T 7/70* (2017.01); *G06T 2207/30176* (2013.01)

(58) Field of Classification Search
CPC ..... G06K 9/00442; G06F 17/24; G06F 16/93; G06Q 10/10
See application file for complete search history.

(56) References Cited

U.S. PATENT DOCUMENTS

| | | | | |
|---|---|---|---|---|
| 6,820,096 | B1* | 11/2004 | Kanevsky | G06Q 10/109 |
| 7,499,588 | B2* | 3/2009 | Jacobs | G06K 9/00463 |
| | | | | 382/173 |
| 2004/0017400 | A1* | 1/2004 | Ly | G06Q 10/06 |
| | | | | 715/810 |
| 2007/0126755 | A1* | 6/2007 | Zhang | G06Q 10/1095 |
| | | | | 345/619 |
| 2011/0205370 | A1* | 8/2011 | Griffin | G06K 9/00449 |
| | | | | 348/207.1 |
| 2013/0036117 | A1* | 2/2013 | Fisher | G06F 16/487 |
| | | | | 707/736 |

\* cited by examiner

*Primary Examiner* — Charles E Lu

(74) *Attorney, Agent, or Firm* — Greenblum & Bernstein, P.L.C.

(57) ABSTRACT

A system for capturing, using a digital camera, a plurality of Scrum board notes, determining if those notes have changed in position or content, and importing those changes into a collaboration and project management system for storage.

18 Claims, 7 Drawing Sheets

AUTOMATIC NOTE BOARD DATA CAPTURE AND EXPORT

TECHNICAL FIELD

The present invention relates generally to methods of and systems for gathering data generated in a non-digital format, converting the data from a non-digital format into a digital format, and inputting the converted data into a software application for use in project tracking and management.

BACKGROUND

The Agile Scrum software development process is an iterative process that involves recurring stand-up meetings (Scrum) during which development team members meet to disclose development progress. During these stand-up meetings, members of the development team disclose the work they performed since the last Scrum, the work that they intend to perform prior to the next Scrum, and any roadblocks that they have encountered. These disclosures are captured on a white board or using Post-it® or similar notecards. Software tools are frequently used to track and preserve these disclosures. A known method of providing the disclosure information to these software programs involves manually keying in the information from each notecard on the whiteboard. This process can be costly due to the time involved to enter the data and the frequency of the Scrums. Additionally, this manual entry process is subject to errors as the result of mistyped entries. Such errors can result in confusion and cause lost time to the development team. Another known method of capturing Scrum data involves the use of a computerized or smart whiteboard. These whiteboard devices can capture the information from Scrums by sensing the content entered by development team members. Such devices generally are not able to read data entered onto notecards and frequently require that the content be entered directly on the whiteboard surface. These requirements limit the ability to rearrange notecards on the whiteboard surface during the Scrum. In addition to limiting the ability to rearrange notecards, these computerized whiteboards can be costly and require that the Scrums be held in a meeting area which has been configured with the computerized whiteboard device. In order to avoid the errors introduced by manual processes and the costs involved in both manual capture and capture using a smart whiteboard, a system for and method of capturing Scrum meeting notes automatically without the requirement of a computerized whiteboard is needed.

SUMMARY

The general inventive concepts encompass a system for and method of capturing Scrum notes utilizing an image capture device, software instructions that receive an image of the captured Scrum notes from the image capture device and convert those notes into text, and a software program that stores those notes for communication to other stakeholders and for the purposes of archiving.

In an exemplary embodiment, a person responsible for capturing Scrum notes uses an image capture device to capture an image of a whiteboard or other medium on which Agile tasks and story statuses have been arranged. The captured image or images are received by a computer processor which executes software instructions that extract tasks and story statuses from the captured image or images. The computer processor executes further software instructions that provide the extracted tasks and story statuses to a collaboration and project management computer program such as Jira (available from Atlassian of Sydney, Australia).

In some exemplary embodiments, an image is received and analyzed to identify the positions of individual scrum notes and their respective content. The position of the notes and note content is compared to previously stored data and position or content changes are stored.

In some exemplary embodiments, the images received are analyzed to determine the boundaries of status categories, and note position is analyzed to determine the status category in which a note is located.

The above and other aspects and advantages of the general inventive concepts will become more readily apparent from the following description and figures, illustrating by way of example the principles of the general inventive concepts.

BRIEF DESCRIPTION OF THE DRAWINGS

These and other features of the general inventive concept will become better understood with regard to the following description and accompanying drawings in which.

DETAILED DESCRIPTION

There are various methods of software development, but iterative development methods are extremely popular due to their flexible approach to meeting the needs of a software development client. One popular iterative development method is the Agile development method. There are many variants to the Agile development method, one of which is referred to as Scrum. The word scrum is a reference to the process of restarting play used in the game of rugby. As used in reference to the Agile development process, Scrum refers to brief, recurring project meetings, generally held each day, in which developers associated with a particular project meet to disclose their activities since the last meeting. During a Scrum, the emphasis is on communication between the various members of the team. A primary method of capturing this communication is the Scrum board. The Scrum board is a place (typically a white board) upon which notes are placed in order to provide information regarding a particular project related activity.

Figure 1:
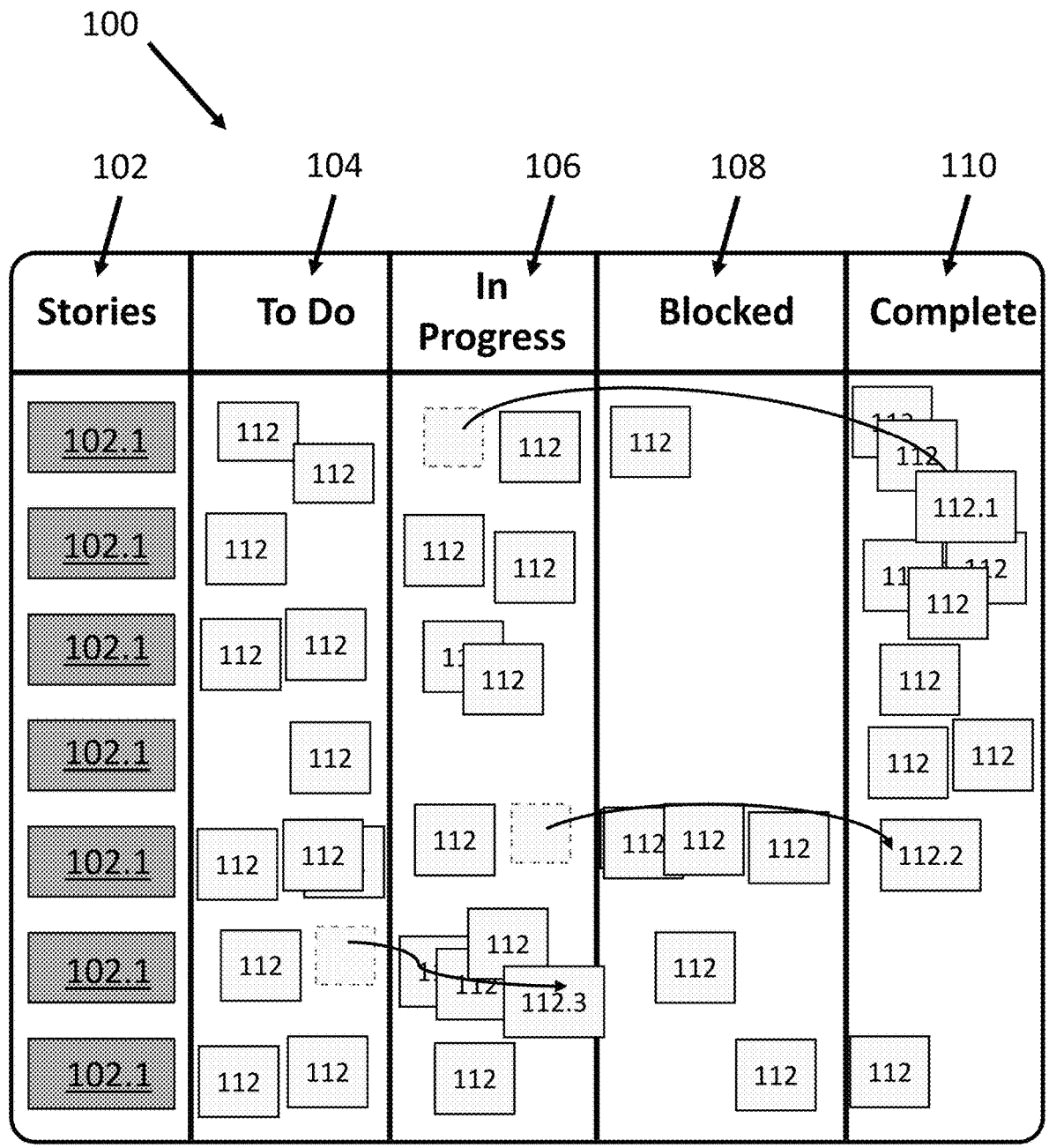
FIG. 1 is a diagram illustrating an exemplary Scrum board used in a Scrum software development process.

Each major project task is listed on the Scrum board and is generally referred to as a story. Each story may have a number of associated tasks. The Scrum board is thus a collection of notes that provide information about the various stories and task items associated with the story. A common approach is to write these notes on self-adhesive labels and place them in position on the Scrum board. An example of a Scrum board is illustrated in FIG. 1. As is shown, the Scrum board 100 may be divided into columns which comprise the name of the story 102, story items to be completed 104, story items that are in-progress 106, story items that are blocked 108, and story items that are complete 110. Notes 112 that are related to the status of each story are placed on the Scrum board 100 during each Scrum meeting. As work on the development progresses, notes 112 are updated or moved across the Scrum board 100 toward the completed column 110. At each Scrum, the notes 112 are updated or moved on the Scrum Board 100 to illustrate the current status of each task of the various stories and thus the status of the development as a whole. For example, notes 112.1 and 112.2, which were previously positioned on the in-progress column, have been moved to the completed column 110. Similarly, note 112.3 was moved from the to do column 104 to the in-progress column 106 to reflect a status update provided at a Scrum. Thus, the Scrum board generally changes at every Scrum to reflect the changing status of tasks associated with the various stories 102. Known methods of capturing and storing the information contained on the Scrum board 100 include manually recording the information from each note and entering that information into a record keeping system. Because Scrums typically take place on a daily basis, and there may be a number of stories associated with a particular development project, the number of changes to the Scrum board 100 can be significant. The process of manually recording information can thus be very time consuming. Additionally, with the manual entry of information, there is the possibility of errors.

Figure 2:
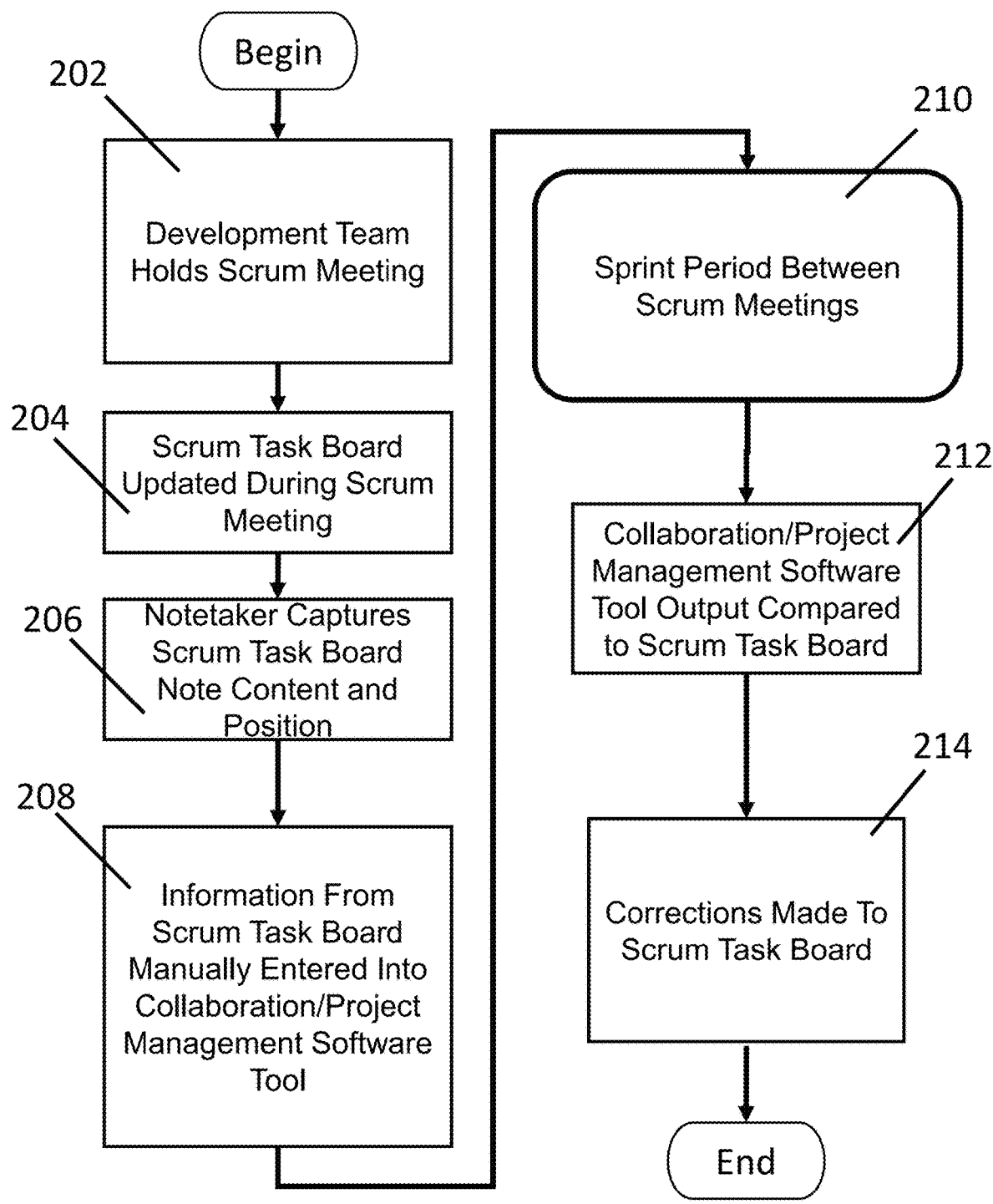
FIG. 2 is a flowchart illustrating the steps taken by known methods of tracking a Scrum software development process and confirming that the Scrum board has not changed since the last Scrum.

FIG. 2 illustrates the steps involved in capturing the information from the new or changed notes that result from a typical Scrum according to known methods. Step 202 represents a Scrum in which a disclosure is provided by developers. This disclosure represents the current status of each story that developers are responsible for completing or tracking. In step 204, new notecards representing newly identified tasks are placed on a Scrum board 100 and existing notes are updated or moved from column to column on the Scrum board according to their status. In step 206, a notetaker records the information from each notecard and its relative position on the Scrum board 100. The notetaker or other person then takes the recorded information and stores it 208 into project management or collaboration software. During the sprint period 210 between Scrums, the developers then work towards the completion of tasks associated with the various stories. As is illustrated in step 212, prior to the start of each Scrum, the notetaker or other person confirms that the Scrum board is accurate with regard to what was stored after the previous Scrum. If there are inaccuracies, the Scrum board 100 is updated 214 such that it reflects the current state of the various stories that make up the project.

Figure 3:
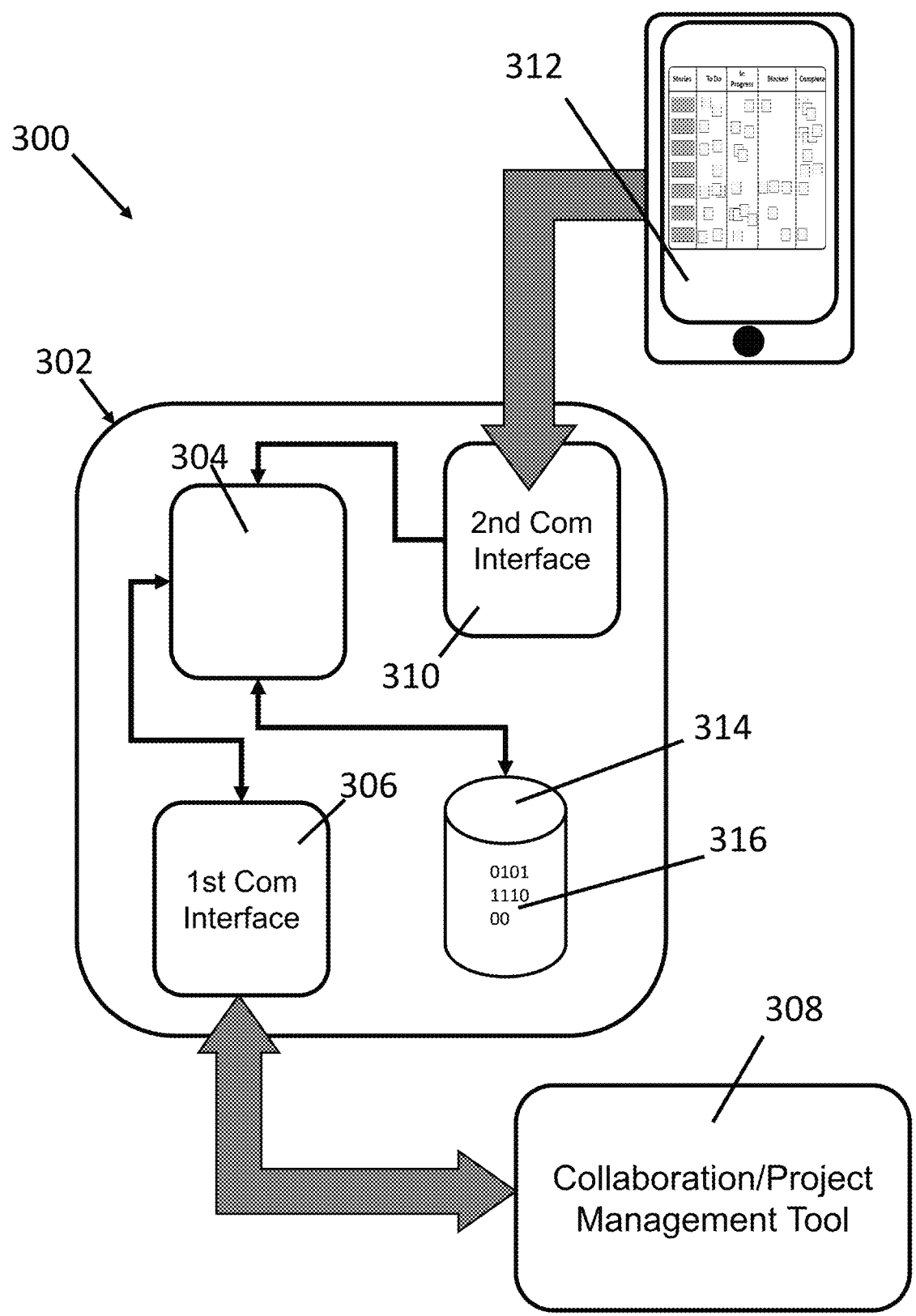
FIG. 3 is a diagram of a system for capturing the Scrum stand-up meeting notes and storing them according to an exemplary embodiment.

A system 300 for automatically capturing Scrum notecard information and storing it into collaboration software according to an exemplary embodiment is shown in FIG. 3. The system 300 comprises a computerized device 302 that further comprises a processor 304, a first communications interface 306 configured to communicate with collaboration/project management software 308 such as Jira or equivalents, a second communications interface 310 that is configured to receive images from a smartphone 312 or other digital camera, and a memory 314 which comprises software instructions 316. These instructions, when executed by the processor, cause the computerized device to perform the steps disclosed herein. In some exemplary embodiments, the first communications interface 306 and the second communications interface 310 may be formed by a single device or circuit. In some exemplary embodiments, the second communications interface 310 may comprise a system that receives images via email, text message, direct electronic connection, or other communications method. Thus, in these embodiments, a user may email, text message, or connect the smartphone 312 directly to the computerized device 302 in order to transfer images from the smartphone to the computerized device.

In some exemplary embodiments of the invention, the first computerized interface 306 may communicate with collaboration/project management software by application program interface (API), storing data into a database (not shown) accessible by both the first computerized interface 306 and the collaboration/project management software 308, upload of a data file via a user interface, or similar methods of providing data to a computer program.

Figure 4:
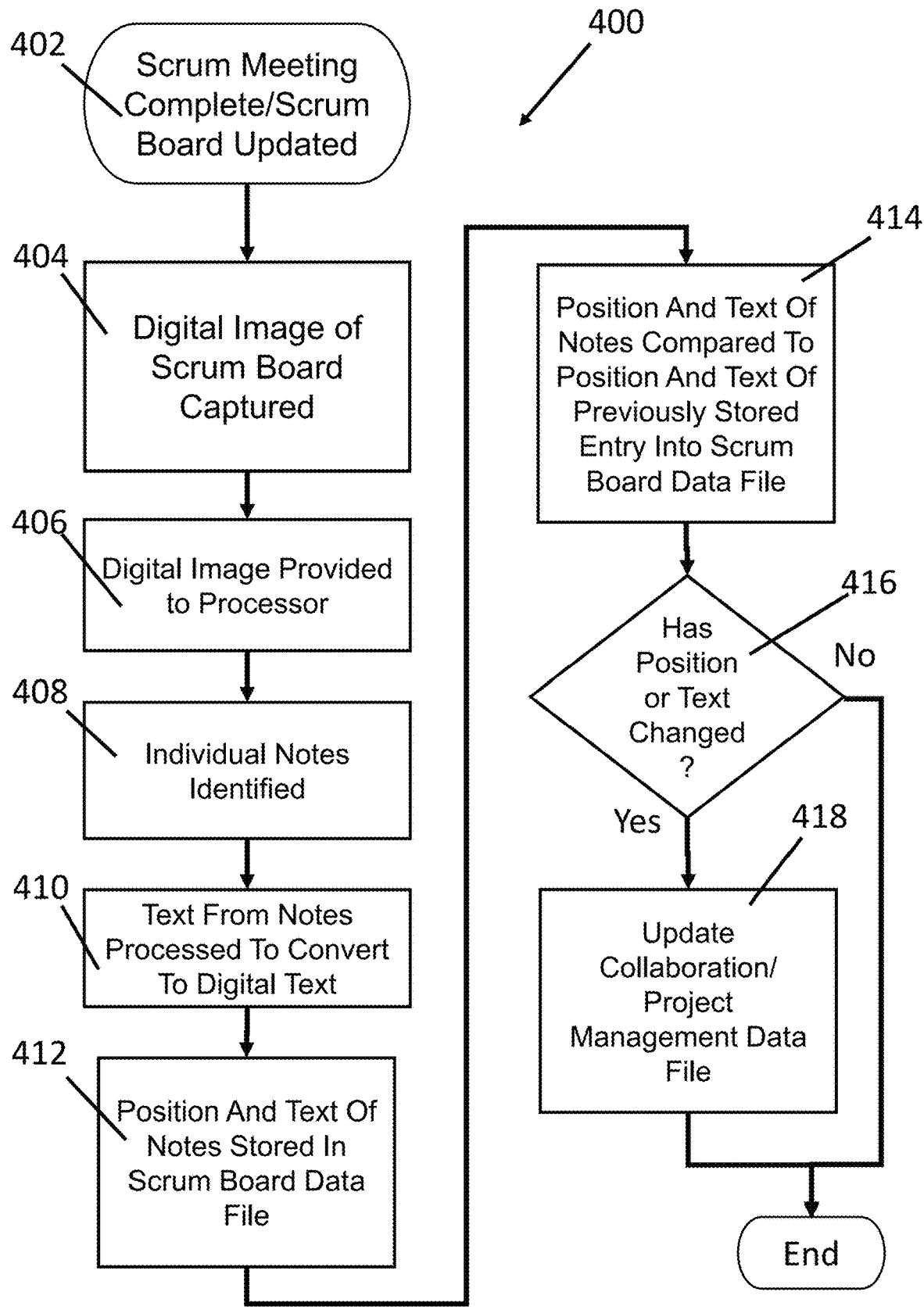
FIG. 4 is a flow chart of the steps taken to capture and store Scrum stand-up meeting notes according to an exemplary embodiment.
Figure 5:
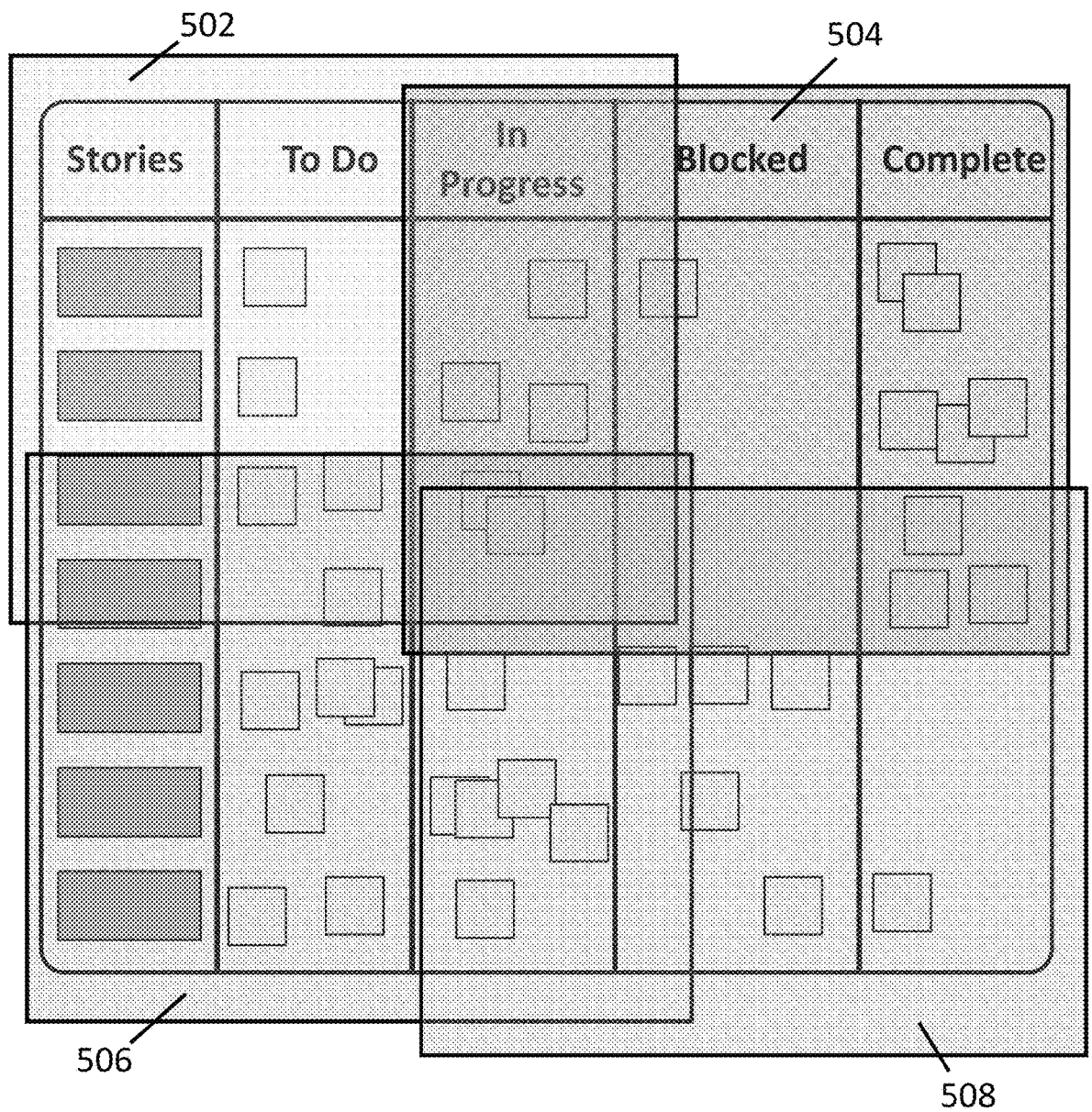
FIG. 5 is a diagram illustrating a plurality of images which are combined by an exemplary embodiment to capture a Scrum board used in a Scrum software development process.

The steps performed by an exemplary embodiment are illustrated in the flowchart 400 of FIG. 4. As is shown, the inventive process starts when the Scrum has been completed and the Scrum board has been updated 402. A digital image of the Scrum board 100 is captured 404 such that each notecard 112 is visible in the image. In certain circumstances, a single image of the Scrum board 100 may not accurately capture the detail of each note 112. In such circumstances, a plurality of images may be captured such that they overlap to provide an image of the complete Scrum board 100. An example of this is illustrated in FIG. 5 where the Scrum Board 100 is captured by four overlapping images 502, 504, 506, and 508. In an exemplary embodiment of the invention, these four images 504-508 are matched and combined to form a complete image of the Scrum board. In an exemplary embodiment, these images may be uploaded to an image sharing and storage site such as Google Photos (Google Corporation). The digital image of the Scrum Board 100 is received by the processor 304 in step 406. If digital the images are stored on an external storage site, the user may initiate a transfer of images to the computerized device 300 or the computerized device may detect the addition of a new image or images and retrieve the image or images automatically. The processor 304 executes software instructions 316 which call image analysis software such as Google Vision (Google Corporation). This image analysis software then identifies the individual notes 112 and their respective positions in step 408. In step 410, the text from each individual note 112 is converted to digital text via optical character recognition, and the text is stored. The position of each individual note 112 and the text associated with each note is also stored in an entry in a Scrum board data file in step 412. In an exemplary embodiment of the invention, the position of each note 112 is analyzed to identify in which column of the Scrum board 100 the note is currently located. In such an embodiment, each note is assigned to the identified column. In step 414, the entry in the Scrum board data file is compared to a previously stored entry to determine if the position of a note 112 has changed from that previously stored position such that the note is located in a new column. In addition to position, step 414 also comprises a check the text of each note to determine if the text has changed. If changes are detected 416 to either or both column location and text, these changes are communicated to the collaboration/project management software 308 in step 418 such that the collaboration/software management software updates the column location and/or text content of each note and stores the updated information.

Figure 6:
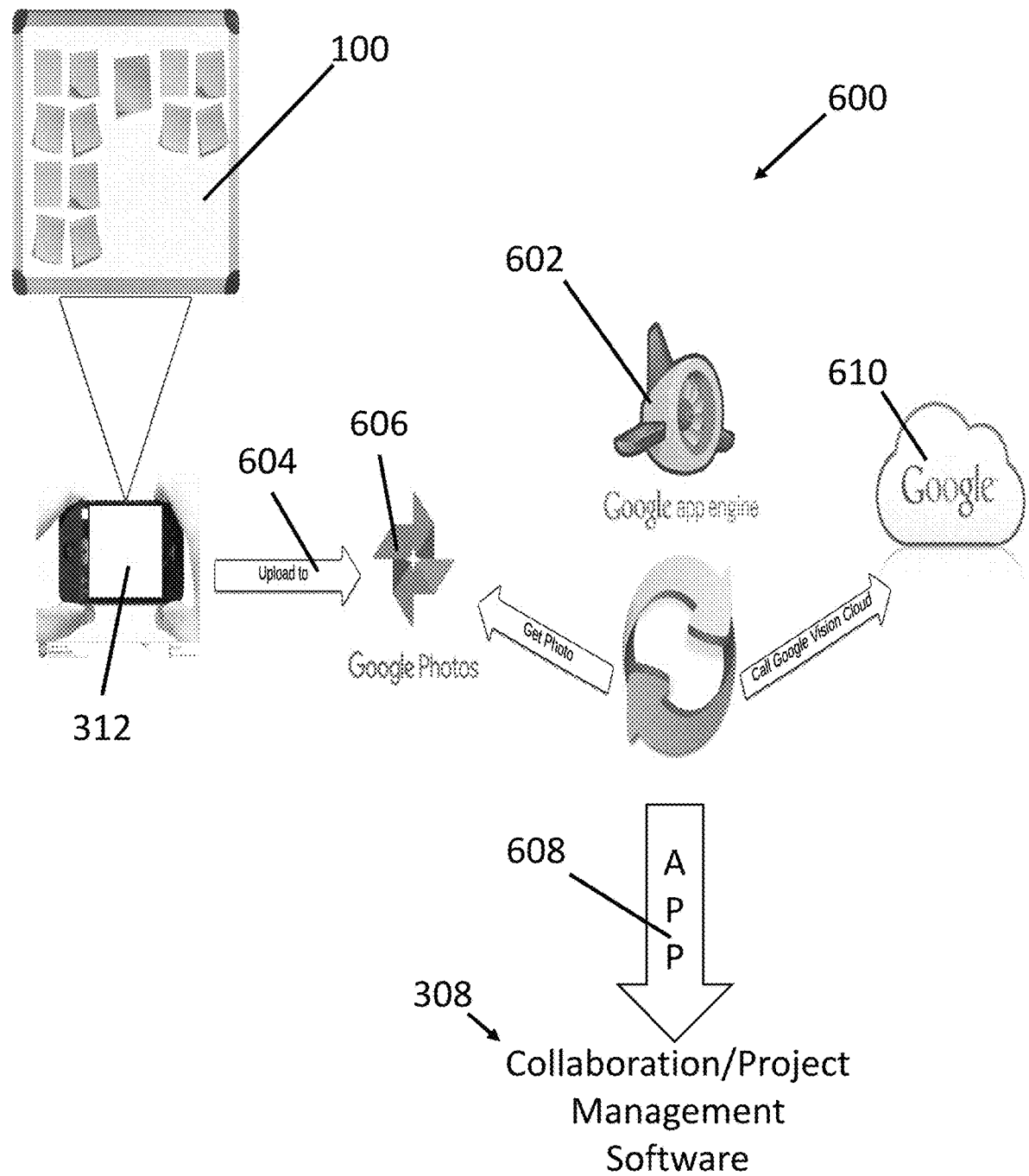
FIG. 6 is a diagram of a virtual system for capturing the Scrum stand-up meeting notes and storing them according to an exemplary embodiment.

In certain exemplary embodiments, the computerized device 302 may be formed by a cloud-based processing service such as Google App Engine. FIG. 6 illustrates such an exemplary embodiment 600. In a cloud-based embodiment 600, the components of the computerized device 302 such as the processor 304, first communications interface 306, second communications interface 310, and storage 314 may be provided virtually by the cloud-based processing service 602. As is shown, images are uploaded 604 from a smart phone 312, which has captured an image of the Scrum board 100, to a photo sharing service such as Google Photos 606. In the illustrated exemplary embodiment, an application 608 running on the cloud based processing service 602 retrieves the images from Google Photos 606 and provides them to an image processing service such as Google Vision 610. As was the case with the exemplary embodiment shown in FIG. 3, the application 608 executes a series of software instructions to perform the steps illustrated in FIG. 4. Changes to the position or text content of note 112 are provided to a collaboration/project management software 308.

Figure 7:
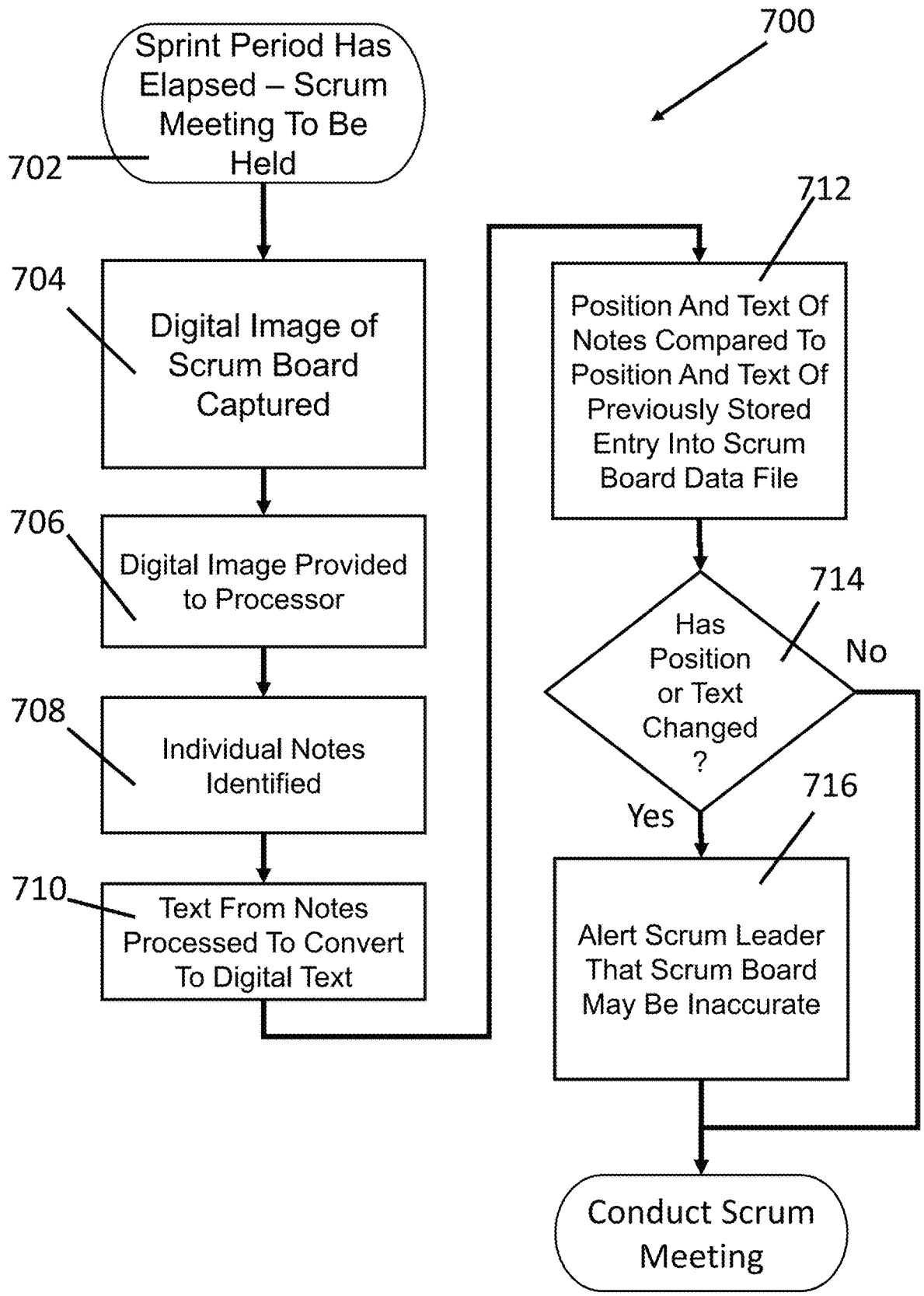
FIG. 7 is a flow chart of the steps taken to detect changes to a Scrum board between Scrums and alert a Scrum leader that such changes were detected.

Because the Scrum board is available to the developers and others between Scrums, it is possible that the notes could be inadvertently moved or lost. While capturing information from a Scrum board in order to archive or share the captured information is illustrated in FIG. 4, in order to facilitate the use of an actual Scrum board 100, an exemplary embodiment also provides the functionality to determine if the notes have been disturbed since the last Scrum meeting. An exemplary embodiment of such functionality 700 is illustrated in FIG. 7. Prior to a Scrum 702, a digital image of the Scrum board 100 is captured in step 704. This digital image is provided to the processor 304 in step 706. Individual notes are identified in step 708 and the text from those notes is converted to digital text in step 710. The position and text of the notes from the digital image is compared to those of an entry stored at the conclusion of the previous Scrum meeting in step 712. A determination is made as to whether changes to the text or position of the notes has occurred in step 714. If changes are detected, an alert is provided to the Scrum leader that indicates that the Scrum board 100 may be inaccurate. The Scrum leader can then take the necessary action to correct the inaccuracy. Thus, the example embodiments greatly reduce the amount of effort and cost associated with capturing Scrum notes.

While the present invention and associated inventive concepts have been illustrated by the description of various embodiments thereof, and while these embodiments have been described in considerable detail, it is not the intention of the Applicant to restrict or in any way limit the scope of the appended claims to such detail. Additional advantages and modifications will readily appear to those skilled in the art. Moreover, in some instances, elements described with one embodiment may be readily adapted for use with other embodiments. Therefore, the invention, in its broader aspects, is not limited to the specific details, the representative apparatus, and illustrative examples shown and described. Accordingly, departures may be made from such details without departing from the spirit or scope of the general inventive concepts.

What is claimed is:

1. A system for tracking repositionable documents, the system comprising:
   a memory; and
   a processor in electronic communication with the memory, the memory comprising software instructions, which, when executed, cause the processor to:
   receive, from an image capturing device that includes at least one from among a smartphone and a digital camera, a digital signal representing at least one digital image of an area that includes a physical board relating to a software development process, the physical board including a plurality of repositionable documents;
   identify a position of each of the repositionable documents in the area based on the digital image by using an image analysis software;
   digitize text from the digital image by using an optical character recognition software;
   determine a content of each of the repositionable documents from the digital image based on the digitized text; and
   for each of the repositionable documents:
   associate the position of the repositionable document with the content of the repositionable document in the digital image;
   create and store an electronic summary of the position of the repositionable document and of the content of the repositionable document;
   compare, as a comparison, the stored electronic summary of the position and the content of the repositionable document to a position and a content of the repositionable document in a previously stored image of the area;
   create and store the comparison in an electronic format corresponding to the area; and
   output at least one result of the comparison to at least one from among a collaboration management software and a project management software.

2. The system of claim 1, wherein causing the processor to identify the position of each of the repositionable documents comprises causing the processor to automatically:
   determine boundaries of a plurality of status categories located in the area;
   determine if an identified document is located predominantly in one of the plurality of status categories; and
   assign the identified document to one of the determined status categories.

3. The system of claim 1, wherein causing the processor to determine the content of each of the repositionable documents comprises causing the processor to automatically:
   identify a document;
   determine boundaries of the identified document; and
   identify alphanumeric information within the determined boundaries.

4. The system of claim 1, wherein the software instructions further cause the processor to cause the execution of a software program that receives the electronic summaries.

5. The system of claim 1, further comprising second software instructions which, when executed, cause the processor to automatically:
   compare the position of each of the repositionable documents with a position of the each of the repositionable documents in a previously received image;
   create a first electronic record of differences detected as the result of the comparison;

identify documents that were not in the previously received image;
create a second electronic record of the documents not in the previously received image;
identify documents that were in the previously received image and are missing from the received image; and
create a third electronic record of the documents in the previously received image and missing from the received image.

6. The system of claim 1, wherein the repositionable documents are independently repositionable.

7. A system for tracking repositionable documents, the system comprising:
a memory; and
a processor in electronic communication with the memory, the memory comprising software instructions, which, when executed, cause the processor to:
receive, from an image capturing device that includes at least one from among a smartphone and a digital camera, a digital signal representing at least one digital image of an area that includes a physical board relating to a software development process, the physical board including a plurality of repositionable documents;
identify a position of each of the repositionable documents in the area based on the digital image by using an image analysis software;
digitize text from the digital image by using an optical character recognition software;
determine a content of each of the repositionable documents from the digital image based on the digitized text; and
for each of the repositionable documents:
associate the position of the repositionable document with the content of the repositionable document in the digital image;
create an electronic summary of the position of the repositionable document and of the content of the repositionable document;
compare, as a comparison, the electronic summary of the position and the content of the repositionable to a position and a content of the repositionable document in a previous image of the area;
output at least one result of the comparison to at least one from among a collaboration management software and a project management software;
create an electronic record of differences determined from the comparison; and
display the determined differences via a user interface.

8. The system of claim 7, wherein causing the processor to determine the content of each of the repositionable documents comprises causing the processor to automatically:
identify each of the repositionable documents;
determine boundaries of each of the identified repositionable documents; and
identify alphanumeric information within the determined boundaries.

9. The system of claim 7, wherein causing the processor to identify the position of each of the repositionable documents comprises causing the processor to automatically:
determine boundaries of a plurality of status categories in the received digital image;
determine if an identified document is located predominantly in one of the plurality of status categories; and
assign the identified document to a position represented by the determined status category.

10. The system of claim 7, wherein causing the processor to display the determined differences comprises displaying a representation of the differences determined from the comparison.

11. The system of claim 7, wherein the previous image was created within 1 day of the received digital image.

12. The system of claim 7, wherein the previous image was created within 1 week of the received image.

13. The system of claim 7, further comprising software instructions which, when executed, cause the processor to generate an alert when the differences are determined.

14. A system for tracking repositionable documents, the system comprising:
a processor in electronic communication with a memory, the memory comprising software instructions, which, when executed, cause the processor to:
receive, from an image capturing device that includes at least one from among a smartphone and a digital camera, a digital signal representing at least one digital image of an area that includes a physical board relating to a software development process, the physical board including a plurality of repositionable documents;
for each of the repositionable documents:
identify a position of the repositionable document within the area based on the digital image by using an image analysis software;
digitize text from the digital image by using an optical character recognition software;
determine a content of the repositionable document from the digital image based on the digitized text;
associate the position and the content of the repositionable document;
create and store an electronic summary of the position and the content of the repositionable document within the received image;
output the electronic summary to at least one from among a collaboration management software and a project management software; and
display the electronic summary in an electronic format via a user interface.

15. The system of claim 14, wherein causing the processor to identify the position of the repositionable document comprises causing the processor to automatically:
determine boundaries of a plurality of status categories from the received digital signal representing the digital image;
determine if an identified position of the repositionable document is predominantly in one of the plurality of status categories; and
assign the repositionable document to one of the determined status categories.

16. The system of claim 14, wherein causing the processor to identify the content of the repositionable document comprises causing the processor to automatically:
identify a document;
determine the boundaries of the identified document; and
identify alphanumeric information within the determined boundaries.

17. The system of claim 14, further comprising software instructions that cause the processor to trigger execution of a software program that receives the created electronic summary.

18. The system of claim 14, further comprising software instructions which, when executed, cause the processor to automatically:

compare, as a second comparison, the position of each of the identified documents with the position of the each of the identified documents in a previously received image;

create a second electronic summary of differences detected as the result of the second comparison;

identify documents that were not in the previously received image; and create an electronic summary of the documents not in the previously received image.

\* \* \* \* \*